June 14, 1949.    J. F. BYRNE    2,473,240
PARALLEL PLATE CAPACITOR
Filed Oct. 1, 1946
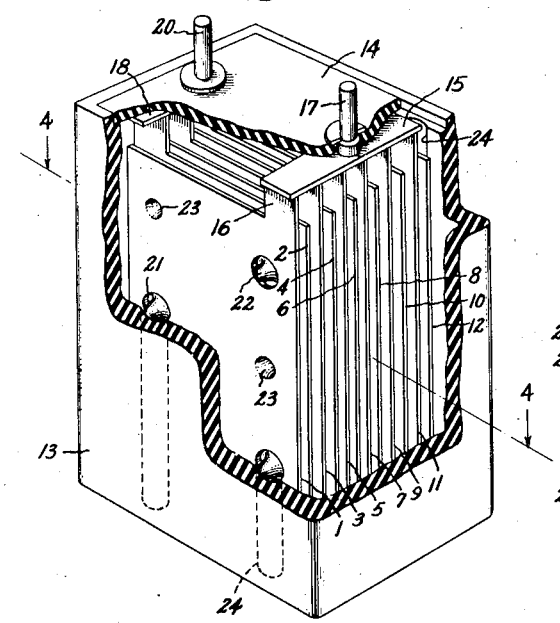
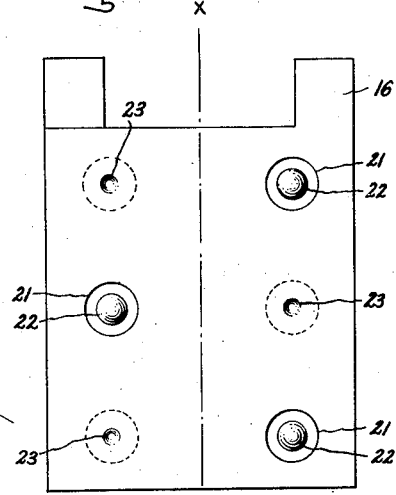
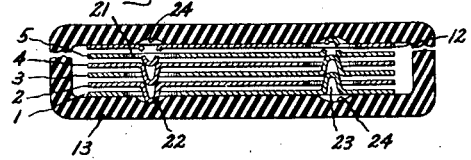
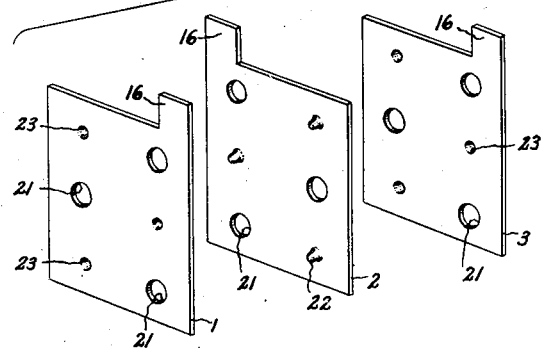
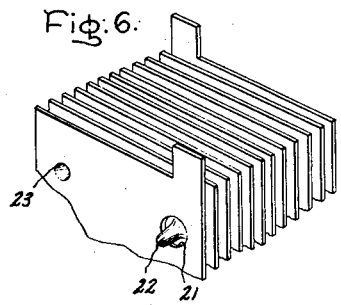
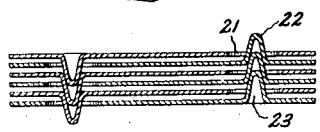
Inventor:
John F. Byrne,
by Ernest F. Britton
His Attorney.

Patented June 14, 1949

2,473,240

UNITED STATES PATENT OFFICE 2,473,240

PARALLEL PLATE CAPACITOR

John F. Byrne, Columbus, Ohio, assignor to General Electric Company, a corporation of New York Application October 1, 1946, Serial No. 700,534

1 Claim. (Cl. 175—41)

My invention relates to parallel plate type electric capacitors in which a plurality of capacitor members or plates are immersed in a suitable dielectric fluid and more particularly to an arrangement for maintaining the desired mechanical and electrical spacing between the members or plates of such capacitors.

In order to space adjacent plates the proper dielectric distance in such capacitors, it has been customary to utilize conventional separators or some other means independent of the plates proper. Thus, it has been necessary not only to provide the material and manufacture these additional parts but also to expend additional time in assembly than would otherwise be required if these parts were unnecessary. It has also been customary to form each member or plate with an extended portion to serve as the connecting or conducting means between a plate and the common interconnector or terminal bar electrically connecting together alternate plates of the same polarity or other means additional to the plates themselves. Like the necessity for spacers, the extended portion of each plate and the common terminal bars require the use of more material than would otherwise be required if they could be eliminated.

It is, therefore, an object of my invention to provide an improved capacitor having fewer parts than prior capacitors, thus tending to reduce not only the material cost but also the cost of assembly.

Another object of my invention is to provide a capacitor construction with an improved method of maintaining the members or plates in spaced relation.

Still another object of my invention is to provide an improved capacitor member or plate which may be used interchangeably in a capacitor as a plate of either polarity.

A further object is to provide a capacitor in which the necessity for a terminal extension on every plate or other means of interconnecting alternate plates has been eliminated.

In accordance with my invention, I provide an improved capacitor member or plate by virtue of which a capacitor may be constructed having identical plates throughout and within which plates are properly spaced by the engagement of protrusions or projections on a plate with its alternate plate.

My invention will be better understood from the following description when taken in connection with the accompanying drawing, and the scope of my invention will be pointed out in the appended claims. In the drawing, Fig. 1 is a perspective view, with the casing partly broken away, of a capacitor construction which is provided with an embodiment of my invention; Fig. 2 illustrates three adjacent plates in perspective and separated better to show their relationship when assembled; Fig. 3 is a front elevation view of the assembled plates shown in Fig. 1; Fig. 4 is a section taken on line 4—4 of Fig. 1; Fig. 5 is a section taken through six plates on the same line as Fig. 4 to show a modified form of my invention; and Fig. 6 is a perspective view of an assembled capacitor with the casing broken away and cover removed, in which the modification shown in Fig. 5 has been incorporated.

Referring to Fig. 1 of the drawing, I have illustrated a capacitor comprising a plurality of independent parallel conducting plates 1, 3, 5, 7, 9 and 11 of a given polarity interleaved with a plurality of similar plates 2, 4, 6, 8, 10 and 12 of opposite polarity, all assembled within an insulating casing 13 and sealed therein by an insulating cover 14. A conducting terminal bar 15, to which the terminal extensions 16 of each plate are connected in any suitable manner, such as welding, serves to electrically interconnect the first group of plates with their common terminal 17, while a similar conducting terminal bar 18 likewise serves to electrically interconnect the second group of plates of opposite polarity to their common terminal 20. Terminals 17 and 20 may be connected to their respective terminal bars 15 and 18 in any suitable manner, such as welding. Each plate is provided with a plurality of openings 21 and a plurality of protrusions or projections 22 symmetrically positioned relative to a vertical axis $x$—$x$ located midway between the vertical edges of each plate, as better shown in Fig. 3.

In the particular embodiment shown in Figs. 1 through 4, each plate is provided with three openings and three cone-shaped protrusions projecting beyond the otherwise flat surface of one face of a plate. Since these particular protrusions are produced by a stamping or pressing process, depressions or hollows 23 will be formed thereby in the opposite face of the same plate. However, it will be apparent from the description which follows that the primary purpose of my invention may still be attained by the employment of various forms of protrusions which may be either hollow or solid and a different number than three.

It is to be observed that the second plate 2 adjacent to the first plate 1 is identical in every respect to plate 1 but its position with respect to plate 1 has been completely reversed or turned 180° about the vertical axis x—x. Likewise, plate 3 adjacent to plate 2 is identical to plates 1 and 2 and is reversed with respect to plate 2 so that its position is the same as plate 1.

Thus, upon assembly, by merely reversing alternate plates so that the terminal extensions of adjacent plates are positioned diametrically opposite each other at one end of the assembly, as shown in Fig. 1, the protrusions of one plate will extend through the openings of its adjacent plate of opposite polarity and will abut against the surface of or engage with the hollow or depression formed by the protrusions on the alternate plate, as the case may be.

Various means may be devised to maintain alternate plates at the spacing established by the dimensional and shape characteristics of the protrusions and to maintain a predetermined equal spacing between plates. To accomplish this and thereby prevent any relative movement between adjacent plates, I prefer to utilize the two parallel insulating side walls of the casing 13 parallel to the faces of the conducting plate. Therein I have shown two recesses or grooves 24 in each of these walls to accommodate the protrusions from the two conducting plates adjacent to the two end conducting plates. Thus, by inspection of Fig. 1 it will be observed that the spacing between the odd numbered group of plates is maintained by the abutment of the flat surface of plate 1 against the inside surface of the nearest casing wall and the abutment of protrusions on plate 11, passing through the openings in plate 12, against the recesses or grooves cut in the inside surface of the opposite casing wall. On the other hand, the spacing between the even numbered group of plates is maintained by the abutment of the protrusions on plate 2, passing through the openings in plate 1, against the recesses or grooves cut in the inside surface of the nearest casing wall and the abutment of the flat surface of plate 12 against the inside surface of the opposite casing wall. The distance between the inside surfaces of these two walls and the depth of each recess are so dimensioned that the assembled group of plates can readily be slid into position within the case.

Therefore, in accordance with my invention, a capacitor may be constructed with the desired dielectric space between the plates thereof and without the necessity of separate spacing means by merely interleaving and reversing plates all of which are identical in every respect.

The size of the openings in each plate must, of course, be in excess of the size of the portion of the protrusions which pass through these holes to prevent electrical contact between adjacent plates. The increase in size of these openings over that required to merely prevent metal to metal contact will be a function of the terminal voltage of the capacitor. The greater the voltage, the greater the clearance should be between the opening and the outside surface of the protrusion passing through it.

Generally, the desired dielectric distance between plates will be established by the distance between the abutment against the flat surface of an end plate and the abutment against the protrusions on the plate of same polarity at the opposite end of the assembly and the length of protrusions beyond the otherwise flat surface of the plate which must, of course, be sufficient to engage alternate plates. So that the dielectric distance between all plates will be equal, it is obvious that protrusions on all plates must be equal in length and the distance between abutments for one group of plates of a given polarity must be equal to the distance between abutments for the group of plates of opposite polarity.

In the particular embodiment illustrated by the drawings, the desired dielectric distance between plates will be a function of or be determined by not only the distance between abutments and the length of protrusions but also by the diameter of the depression at the heel of the protrusion, the outside diameter at its tip and the taper or angle of the wall of the protrusion with respect to face of the plate.

In the assembly shown in Fig. 1 and variously detailed in Figs. 2, 3 and 4, a line contact has been employed between the inside depression of each protrusion and the outside tip of the protrusion engaging it and each plate has been shown with its own terminal extension 16 for connection of alternate plates of the same polarity to a terminal bar, 15 or 18. Since such line contact may not be sufficient to carry the current or properly interconnect alternate plates, the terminal extension from each plate may be a requisite in many cases to perform this function, depending upon the electrical characteristics of the current and the overall design.

Nevertheless, the necessity for a terminal on all plates, with the exception of two, may in many cases be eliminated by making the shape and dimensional characteristics of the protrusions such that there will be surface rather than line contact between them.

Thus, in Fig. 5 is illustrated a modification of my invention showing the protrusions 22 and the depressions 23 so dimensioned and shaped that the protrusions 22 of each plate engage the depressions 23 of its alternate plate, in surface rather than line contact. The result of such modification is illustrated by reference to Fig. 6 showing an assembly of plates in which the terminal extensions 16 on all plates, with the exception of two, has been dispensed with. Nevertheless, adjacent plates therein are both mechanically and electrically separated and alternate plates of the same polarity are electrically interconnected. Obviously, the two plates having terminal extensions may be more centrally located in the assembly than in the end positions shown.

While I have, in accordance with the patent statutes, shown and described a particular embodiment of my invention and modifications thereof, other changes and modifications will be obvious to those skilled in the art and I therefore aim in the appended claim to cover all such changes and modifications as fall within the true spirit and scope of my invention.

What I claim as new and desire to secure by Letters Patent of the United States is:

In an electric capacitor, a plurality of spaced and identical conducting plates, each of said plates containing a plurality of projections and an equal number of openings, each of said projections comprising a hollow protrusion extending beyond the surface of one face of a plate and defining a depression in the opposite face thereof, said protrusions on alternate plates of a given polarity extending through said openings in adjacent plates of opposite polarity and engaging said depressions in alternate plates, and means for maintaining said plates as an assembled unit comprising the two insulating side walls of case, each of said side walls being parallel to and the inside surfaces thereof in slidable contact with the outside face of one of the end conducting plates of the assembly and containing grooves or slidably accommodating the protrusions extending through the openings in the adjacent end conducting plate.

JOHN F. BYRNE.

REFERENCES CITED

The following references are of record in the file of this patent:

UNITED STATES PATENTS

| Number | Name | Date |
|---|---|---|
| 414,438 | Osburn | Nov. 5, 1889 |
| 1,394,279 | Coleman | Oct. 18, 1921 |
| 1,626,684 | Marbury | May 3, 1927 |
| 1,633,285 | Proctor | June 21, 1927 |

FOREIGN PATENTS

| Number | Country | Date |
|---|---|---|
| 289,304 | Germany | Dec. 18, 1915 |
| 651,592 | France | Oct. 9, 1928 |
| 700,219 | France | Dec. 22, 1930 |